No. 833,237. PATENTED OCT. 16, 1906.
G. A. OLSON.
TWINE HOLDER AND CUTTER.
APPLICATION FILED DEC. 29, 1903.
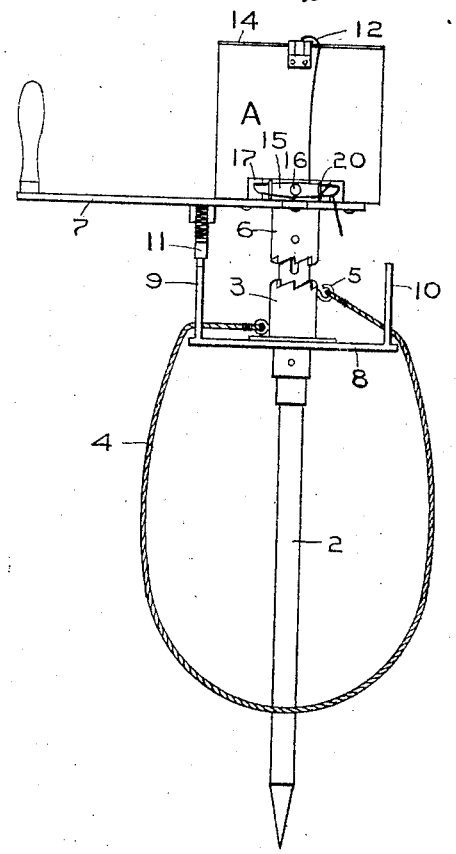
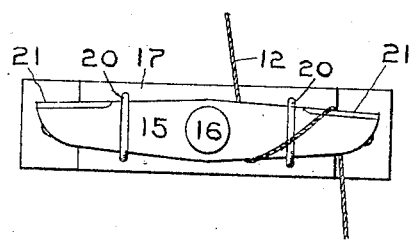
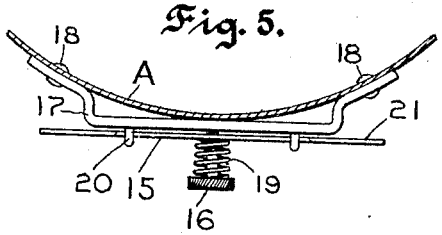
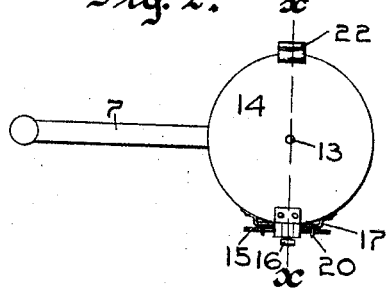
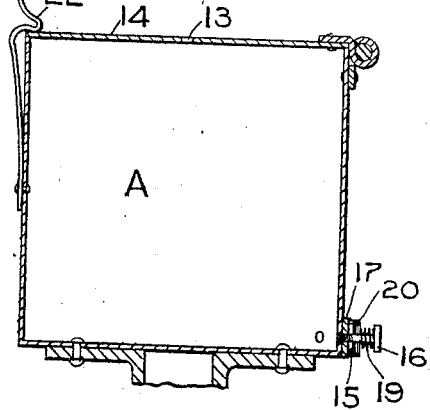
Witnesses.
W. H. Palmer.
Emily F. Otis
Inventor,
Gustav A. Olson.
by Lothrop & Johnson
his Attorneys.

UNITED STATES PATENT OFFICE.

GUSTAV A. OLSON, OF ALBERT LEA, MINNESOTA.

TWINE HOLDER AND CUTTER.

No. 833,237.     Specification of Letters Patent.     Patented Oct. 16, 1906.

Application filed December 29, 1903. Serial No. 186,955.

*To all whom it may concern:*

Be it known that I, GUSTAV A. OLSON, a citizen of the United States, residing at Albert Lea, in the county of Freeborn and State of Minnesota, have invented certain new and useful Improvements in Twine Holders and Cutters, of which the following is a specification.

My invention relates to improvements in twine holders and cutters adapted particularly for use in shock-compressors; and it consists in the features of construction and combination hereinafter described and claimed.

In the accompanying drawings, forming part of this specification, Figure 1 is a front elevation of a shock-compressor shown fitted with my improved twine-holder. Fig. 2 is a top view of the same. Fig. 3 is a section on line *x x* of Fig. 2, and Figs. 4 and 5 are details of the twine holding and cutting strip.

In the drawings the twine-holder is shown in connection with a shock-compressor of the kind shown and described in my application for patent filed February 10, 1903, Serial No. 142,766. This compressor comprises a thrust-pin 2, upon the upper or outer end of which is a revoluble spool 3. A compressing-rope 4 is secured to one side of the spool, and its free end is adapted to be detachably connected with a hook 5 upon the other side of the spool. The spool is toothed upon its outer end to engage a toothed clutch member 6, carried by an actuating-handle 7. 8 represents a guard-plate having upwardly-projecting slotted ends 9 and 10 to receive and guide the compressing-rope. These ends coöperate with a dog or catch 11, projecting downwardly from the handle 7 to prevent the spool from turning backward.

Carried by the handle 7 is a twine box or carrier A for holding binding-twine 12. Secured to the side of the box by rivets 18 is a plate 17, having outwardly-projecting staples or guides 20, within which is arranged the slidably-removable twine holding and cutting strip 15. The staples are of sufficient span to permit the strip to be drawn through them at pleasure. The strip is supported and held from longitudinal movement in the guides by means of a thumb-screw 16, passing centrally through the strip and having screw-engagement with the plate 17. The strip is held against the plate 17 by its own resiliency when made of spring metal or by means of a spring 19, interposed between the strip and the head of the screw. The degree of spring-pressure of the strip against the plate may be adjusted and regulated by the screw. The upper side of each end of the strip is ground to a knife-edge 21, so that the twine may be cut by drawing it across one of these edges. The hinged cover 14 of the box is held normally closed by a spring-catch 22.

In use the twine 12 passes through the opening 13 in the top of the carrier and thence downwardly under the spring-pressed strip 15, which holds it and prevents it from becoming tangled or unraveled. When the shock has been sufficiently compressed, the twine is drawn out under the spring-pressed strip 15, carried around the shock, and cut to the required length by drawing it over one of the cutting edges 21 of the strip, as illustrated in Fig. 4. This leaves a free end of twine of a length not less than the width of the strip projecting downwardly in position to be grasped by the operator when it is desired to draw it out for the next tie.

Having now described my invention, what I claim as new, and desire to secure by Letters Patent, is—

1. The combination, with a twine-carrier of the class described, of guides carried thereby, a spring-pressed strip removably supported within the guides and formed near one end with a cutting edge, and means to regulate the spring-pressure.

2. The combination, with a twine-carrier of the class described, of a strip adjustably secured upon the carrier and forming a guide for the twine, said strip having an upper cutting edge near its end, and spring means for holding the strip against the free end of the twine.

3. The combination, with a twine-carrier of the class described, of a strip carried thereby and adapted to hold the free end of the twine under spring-pressure, said strip having a knife-edge near its end, and means for regulating and adjusting the spring-pressure.

4. The combination, with a twine-carrier of the class described, of a supporting-plate secured upon the side of the carrier, outwardly-extending guides carried by the plate, a strip movably supported in said guides, an adjusting-screw passing centrally through the strip, and a coil-spring interposed between the head of the screw and the strip, the strip being formed near its end with a cutting edge.

In testimony whereof I affix my signature in presence of two witnesses.

GUSTAV A. OLSON.

Witnesses:
E. S. HAMMOND,
ROBERT J. TWEEDY.